United States Patent
Segal et al.

(10) Patent No.: US 9,661,256 B2
(45) Date of Patent: *May 23, 2017

(54) SYSTEM AND METHOD FOR PROVIDING AND INTERACTING WITH COORDINATED PRESENTATIONS

(71) Applicant: Touchcast LLC, New York, NY (US)

(72) Inventors: Edo Segal, New York, NY (US); Charles Miller, Brooklyn, NY (US); Daniel Guerrero, Puebla (MX)

(73) Assignee: TOUCHCAST LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,984

(22) Filed: Aug. 24, 2015

(65) Prior Publication Data
US 2015/0381921 A1    Dec. 31, 2015

Related U.S. Application Data

(63) Continuation-in-part of application No. 14/316,536, filed on Jun. 26, 2014, now Pat. No. 9,363,448.
(Continued)

(51) Int. Cl.
*H04N 5/445* (2011.01)
*G11B 27/031* (2006.01)
(Continued)

(52) U.S. Cl.
CPC ....... *H04N 5/44513* (2013.01); *G11B 27/031* (2013.01); *H04N 5/2222* (2013.01);
(Continued)

(58) Field of Classification Search
CPC .......... H04N 5/265; H04N 5/2222; H04N 21/25891; H04N 21/4316; H04N 21/4722; G11B 27/031
See application file for complete search history.

(56) References Cited

U.S. PATENT DOCUMENTS

| | | | |
|---|---|---|---|
| 7,577,978 B1 | 8/2009 | Wistendahl et al. | |
| 8,508,614 B2 * | 8/2013 | Segal | H04N 5/265 348/222.1 |

(Continued)

FOREIGN PATENT DOCUMENTS

| | | |
|---|---|---|
| WO | WO 2010/141939 | 12/2010 |
| WO | WO 2012/139082 | 10/2012 |
| WO | WO 2013/076478 | 5/2013 |

*Primary Examiner* — Huy T Nguyen
(74) *Attorney, Agent, or Firm* — Leason Ellis LLP

(57) ABSTRACT

A system and method for providing uninterrupted video content in a portion of a display while simultaneously providing other content. A coordinated presentation is provided that comprises a content unit and a plurality of controllable display units. The content unit plays video content, a first controllable display unit plays first interactive video content and a second controllable display unit plays second interactive video content. Information regarding a selection event that occurred in the first controllable display unit is received, and a representation of the coordinated presentation is generated. The representation of the coordinated presentation is provided in a third controllable display unit without interrupting the playing of the video content. The first interactive video content is provided in the content unit, wherein the first interactive video content replaces the video content and without interrupting the playing of the first interactive video.

17 Claims, 14 Drawing Sheets

Related U.S. Application Data

(60) Provisional application No. 62/040,970, filed on Aug. 22, 2014.

(51) Int. Cl.

| | | |
|---|---|---|
| *H04N 5/222* | (2006.01) | |
| *H04N 5/265* | (2006.01) | |
| *H04N 21/258* | (2011.01) | |
| *H04N 21/431* | (2011.01) | |
| *H04N 21/4722* | (2011.01) | |
| *H04N 21/4782* | (2011.01) | |
| *H04N 21/658* | (2011.01) | |
| *H04N 21/81* | (2011.01) | |

(52) U.S. Cl.
CPC ....... *H04N 5/265* (2013.01); *H04N 21/25891* (2013.01); *H04N 21/4316* (2013.01); *H04N 21/4722* (2013.01); *H04N 21/4782* (2013.01); *H04N 21/6582* (2013.01); *H04N 21/812* (2013.01); *H04N 21/8133* (2013.01); *H04N 2005/44521* (2013.01)

(56) References Cited

U.S. PATENT DOCUMENTS

| | | |
|---|---|---|
| 8,584,164 B2 | 11/2013 | Walter et al. |
| 8,745,657 B2 | 6/2014 | Chalozin et al. |
| 9,036,043 B2 * | 5/2015 | Segal ................... H04N 5/2222 348/222.1 |
| 9,363,448 B2 * | 6/2016 | Segal ................... H04N 5/265 |
| 2001/0006382 A1 | 7/2001 | Sevat |
| 2002/0186233 A1 | 12/2002 | Holtz et al. |
| 2005/0137958 A1 | 6/2005 | Huber et al. |
| 2008/0096175 A1 | 4/2008 | du Toit et al. |
| 2008/0150913 A1 | 6/2008 | Bell et al. |
| 2009/0153804 A1 | 6/2009 | Giraldo et al. |
| 2009/0237565 A1 | 9/2009 | Staker et al. |
| 2010/0174783 A1 | 7/2010 | Zarom |
| 2011/0202827 A1 | 8/2011 | Freishtat |
| 2011/0249075 A1 | 10/2011 | Abuan et al. |
| 2011/0254912 A1 | 10/2011 | Mock et al. |
| 2011/0298935 A1 | 12/2011 | Segal |
| 2013/0073985 A1 | 3/2013 | Hamlin et al. |
| 2013/0173355 A1 | 7/2013 | Barcenas |
| 2013/0212615 A1 | 8/2013 | Schultz |
| 2014/0002581 A1 | 1/2014 | Bear et al. |
| 2014/0132702 A1 | 5/2014 | Leibovich et al. |
| 2014/0215542 A1 | 7/2014 | Terpe |
| 2015/0149930 A1 | 5/2015 | Walkin et al. |

* cited by examiner

SYSTEM AND METHOD FOR PROVIDING AND INTERACTING WITH COORDINATED PRESENTATIONS

CROSS-REFERENCE TO RELATED APPLICATION

The present application is based on and claims priority to U.S. Patent Application Ser. No. 62/040,970, filed Aug. 22, 2014, and is a continuation-in-part and claims priority to U.S. patent application Ser. No. 14/316,536, filed Jun. 26, 2014 and entitled SYSTEM AND METHOD FOR PROVIDING AND INTERACTING WITH COORDINATED PRESENTATIONS, which are incorporated by reference as if expressly set forth in their respective entireties herein.

FIELD

The present application relates, generally, to content presentation and, more particularly, to a system and method for providing and interacting with coordinated presentations.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

The present application addresses this in a system and method in which the broadcaster, who may be an individual using a portable computer device, provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

BRIEF SUMMARY OF THE INVENTION

In one or more implementations, herein is disclosed a system and method for providing a coordinated presentation. In one or more implementations, a system and method for providing uninterrupted video content in a portion of a display while simultaneously providing other content in separate portions of the display. A coordinated presentation is provided that comprises a content unit and a plurality of controllable display units. The content unit plays video content, a first controllable display unit plays first interactive video content while the video content plays in the content unit, and a second controllable display unit plays second interactive video content while the video content plays in the display unit and the first interactive video content plays in the first controllable display unit. Information regarding a selection event that occurred in the first controllable display unit is received, and a representation of the coordinated presentation is generated, including each of the content unit and the plurality of controllable display units. The representation of the coordinated presentation is provided in a third controllable display unit without interrupting the playing of the video content. The first interactive video content is provided in the content unit, wherein the first interactive video content replaces the video content and without interrupting the playing of the first interactive video.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF EMBODIMENTS

Figure 1:
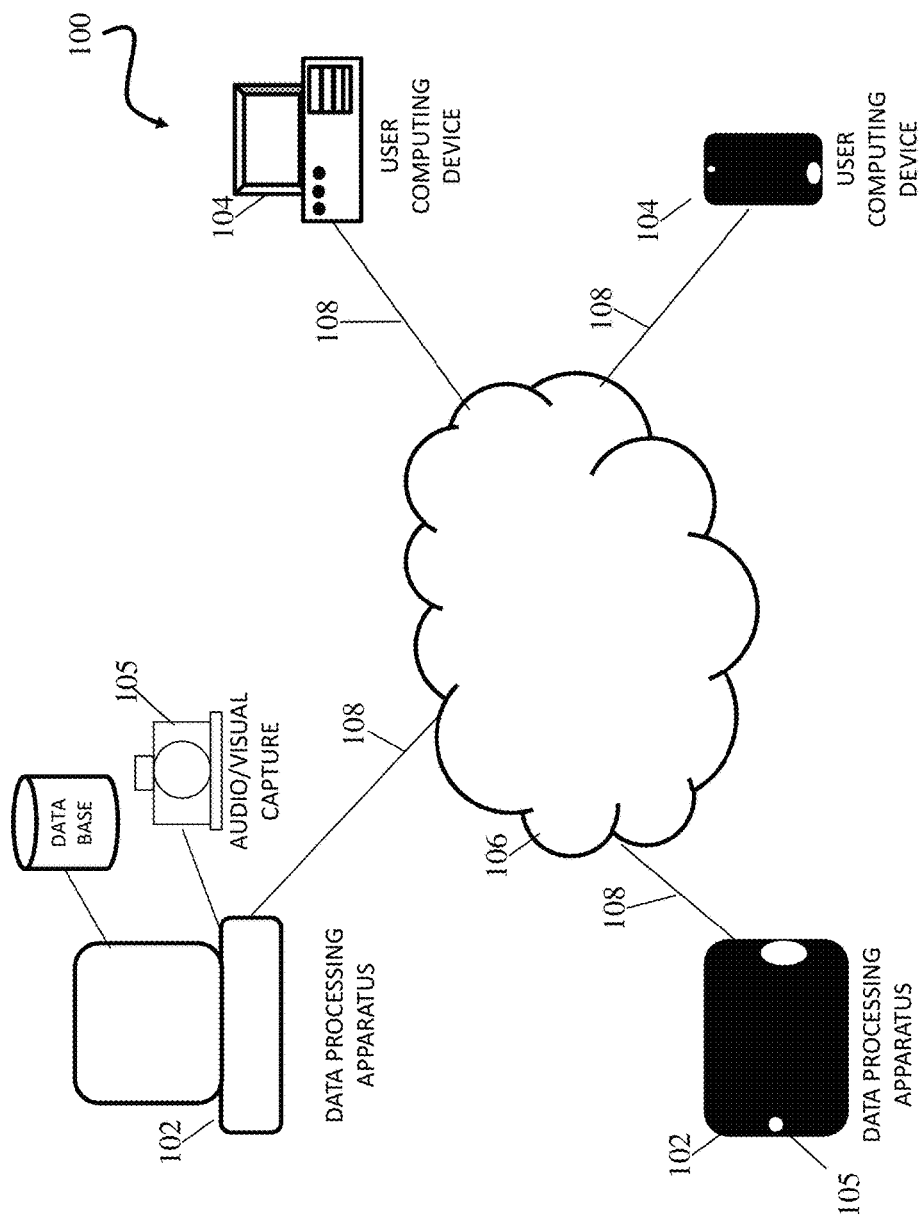
FIG. 1 is a diagram illustrating an example hardware arrangement that operates for providing the systems and methods disclosed herein.

By way of introduction and overview, in one or more implementations the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations including videos that include customizable and interactive features for use by one or more end-users that receive the presentations. Further, the software applications provide a viewing/interactive tool, referred to herein, generally, as a "consuming" interface, for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

The present application includes and improves upon functionality associated with providing video content and other content in respective separately and independently controllable portions of a display screen. For example, a content unit module can be set forth in a first portion of a display to provide content, whereby the content is received from a first computing device. Further, an independently controllable display unit can be provided in a second separate portion of the same display. The display unit can be configured to include interactive media content and further can be configured to enable interaction with the interactive media content at each of a plurality of remote devices. Results of a respective interaction at a particular remote device can be viewable or otherwise presented at the particular remote device, but not viewable or otherwise presented at other of the remote devices.

In one or more implementations, a video mixer module can be provided that comprises instructions executing so as to configure a processor to integrate a plurality of images captured by a camera together with a portion of the curated content via a user selection from a touch-screen interface, and thereby to generate a coordinated presentation that is capable of transmission to and receipt by one or more remote devices; and wherein the coordinated presentation is configured to enable interaction with the portion of the curated content at each of the remote devices such that results of a respective interaction at a particular remote device are viewable at the particular remote device but are not viewable at (a) other of the remote devices and (b) the display.

In one or more implementations of the present patent application, a processor configured with code processes information representing a selection event that occurs in the display unit. For example, a user clicks his or her mouse in a portion of the display unit while the interactive media content in the display unit is provided therein. The processing that occurs can be to determine at least a relative time and location of the selection event that occurred in the second portion of the display. The information representing the selection event can be stored in one or more databases that are accessible to at least one computing device. The stored information can be used to develop analytics vis-à-vis historical representations of user activity. Furthermore, the selection of an item can be processed to enable the interaction with at least a portion of the interactive media content at one of the remote devices associated with the selection event. This enables results of a respective interaction associated with the selection event to be viewable or otherwise provided at one particular remote device, but not viewable or otherwise provided at other of the remote devices.

Furthermore, in one or more implementations the interactive media content can be configured as an advertisement. The display unit may be configured to include an ad unit that includes a player tool that can be integrated or otherwise "wrapped" within source code of an Internet website or other application. The ad unit can also include the interactive media content that is played by the player device within the display unit.

In one or more implementations, the stored information represents the selection event, such as the relative time of the event and/or a relative location in the display unit, and metrics associated with selection events that occur within the display unit for a plurality of computing devices can be calculated. For example, a plurality of individual users make selections within the display unit on their respective devices, and information associated with the respective selection events is stored and used to determine metrics.

In one or more implementations, a user interface is provided that identifies or includes a graphical representation of metrics that are determined as a function of the stored information representing the respective selection events. For example, interactive media content can be played back for viewing and graphical representations of user activity can overlay the interactive media content as it plays. This can provide, substantially in real-time as the playback occurs, graphical representations of where and when selection events occurred. This information is particularly useful, for example, for identifying potential strengths and weaknesses in a design of an interactive presentation, in accordance with the present application, and for automatically, substantially automatically, and/or manually revising presentations.

In one or more implementations, coordinated presentations may be configured with interactive options, which may include images, video content, website content, or computer programs (collectively referred to herein, generally, as "vApps"). An authoring tool can be integrated with a player tool, and the tools enable one or more vApps to be embedded in video or, in one or more implementations, a code is embedded in the video for enhanced functionality. For example, a play/pause button can be provided that enables a user to play or pause playback of a coordinated presentation. A timeline function can be provided that identifies a current time location within a coordinated presentation as well as to navigate therein. vApp icons can be provided that represent vApps that are included with the current coordinated presentation at respective time locations therein. In accordance with one or more implementations, as a respective icon is selected by the user, the coordinated presentation jumps to the corresponding time location, and the user can interact with the respective vApp. Information can be time coded in video, and selectable user interactive elements for navigation/time can be provided.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1, a diagram is provided of an example hardware arrangement that operates for providing the systems and methods disclosed herein, and designated generally as system 100. In the implementation shown in FIG. 1, system 100 includes one or more data processing apparatuses 102 that are at least communicatively coupled to one or more user computing devices 104 across communication network 106. User computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time.

In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases for the present application, including image files, video content, documents, audio/video recordings, metadata and other information. In addition, data processing apparatus 102 can be configured to access Internet websites and other online content. It is contemplated that data processing apparatus 102 can access any required databases via communication network 106 or any other communication network to which data processing apparatus 102 has access. Data processing apparatus 102 can communicate with devices including those that comprise databases, using any known communication method, including Ethernet, direct serial, parallel, universal serial bus ("USB") interface, and/or via a local or wide area network.

User computing devices 104 communicate with data processing apparatus(es) 102 using data connections 108, which are respectively coupled to communication network 106. Communication network 106 can be any communication network, but is typically the Internet or some other global computer network. Data connections 108 can be any known arrangement for accessing communication network 106, such as the public internet, private Internet (e.g., VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 can be configured to send and receive data across communication network 106, and are equipped with web browsers, software applications, or other means, to provide received data on display devices incorporated therewith. By way of example, user computing device 104 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an implementation of the present application, user computing device 104 provides user access to data processing apparatus 102 and/or other devices for various purposes, including to control applications associated therewith and for receiving and providing information. The various functionality provided by system 100 and, in particular, data processing apparatus(es) 102 and user computing device(s) 104 is described in detail below.

Devices included in system 100 can be configured with or access software that, when executed, causes the devices to provide functionality described in greater detail herein. Such software can reside on one or more data processing apparatuses 102, user computing devices 104 and/or other devices. One of the functions that can be performed by data processing apparatus 102 is that of operating as a server and/or a web site host. Data processing apparatus 102 typically communicates with communication network 106 across a permanent e.g., un-switched, data connection 108. Permanent connectivity ensures that access to data processing apparatuses 102 is always available.

Figure 2:
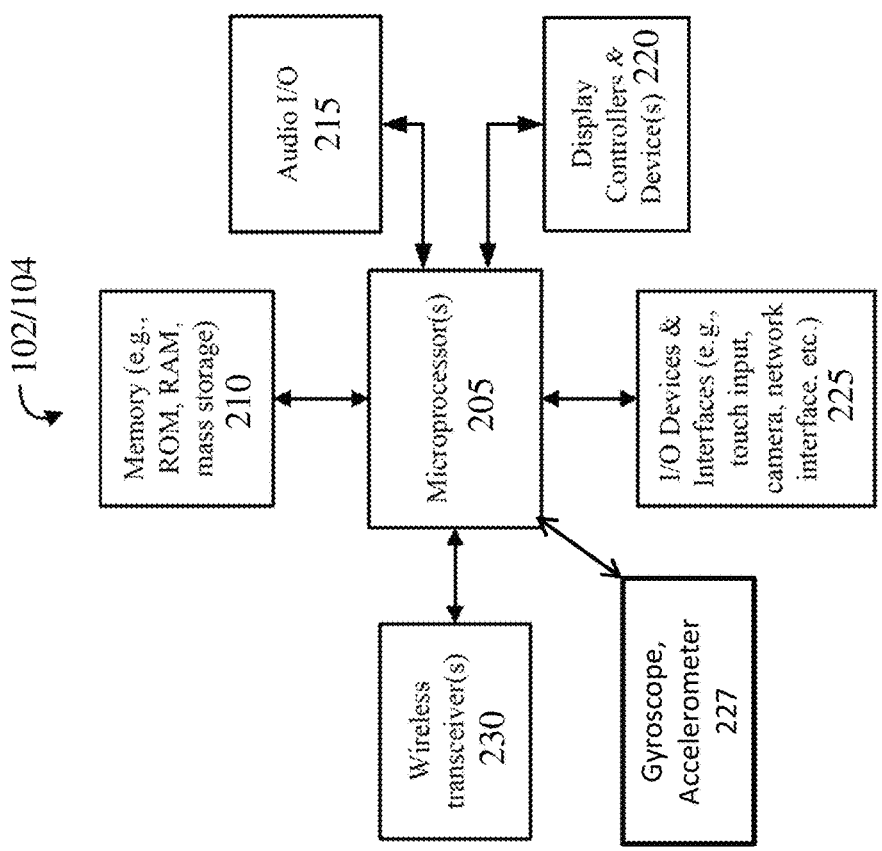
FIG. 2 is a block diagram that illustrates functional elements of a computing device in accordance with an embodiment.

FIG. 2 illustrates, in block diagram form, an exemplary data processing apparatus 102 and/or user computing device 104 that can provide functionality in accordance with the teachings herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type.

The data processing apparatus 102 and/or user computing device 104 can also include an audio input/output subsystem 215 which may include a microphone and/or a speaker for, for example, playing back music, providing telephone or voice/video chat functionality through the speaker and microphone, or the like.

A display controller and display device 220 provides a visual user interface for the user; this user interface can include a graphical user interface which, for example, is similar to that shown on a Macintosh computer when running Mac OS operating system software or an iPad, iPhone, or similar device when running iOS operating system software.

The data processing apparatus 102 and/or user computing device 104 also includes one or more wireless transceivers 230, such as an IEEE 802.11 transceiver, an infrared transceiver, a Bluetooth transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided Moreover, one or more buses, can be used to interconnect the various modules in the block diagram shown in FIG. 2.

The data processing apparatus 102 and/or user computing device 104 may be a personal computer, tablet-style device, such as an iPad, a personal digital assistant (PDA), a cellular telephone with PDA-like functionality, such as an iPhone, a Wi-Fi based telephone, a handheld computer which includes a cellular telephone, a media player, such as an iPod, an entertainment system, such as a iPod touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire, etc., to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

Additional components, not shown, can also be part of the data processing apparatus 102 and/or user computing device 104, and, in certain implementations, fewer components than that shown in FIG. 2A may also be used in data processing apparatus 102 and/or user computing device 104. Furthermore, and as described herein, computer-implemented methods may be carried out in a computer or other data processing system in response to its processor or processing system executing sequences of instructions contained in a memory, such as memory 210 or other machine-readable storage medium. The software may further be transmitted or received over a network (not shown) via a network interface device 225. In various implementations, hardwired circuitry may be used in combination with the software instructions to implement the present implementations. Thus, the techniques are not limited to any specific combination of hardware circuitry and software, or to any particular source for the instructions executed by the data processing apparatus 102 and/or user computing device 104.

FIGS. 3-8 are described below and illustrate a series of display screens provided in accordance with an example implementation of the present patent application.

Figure 3:
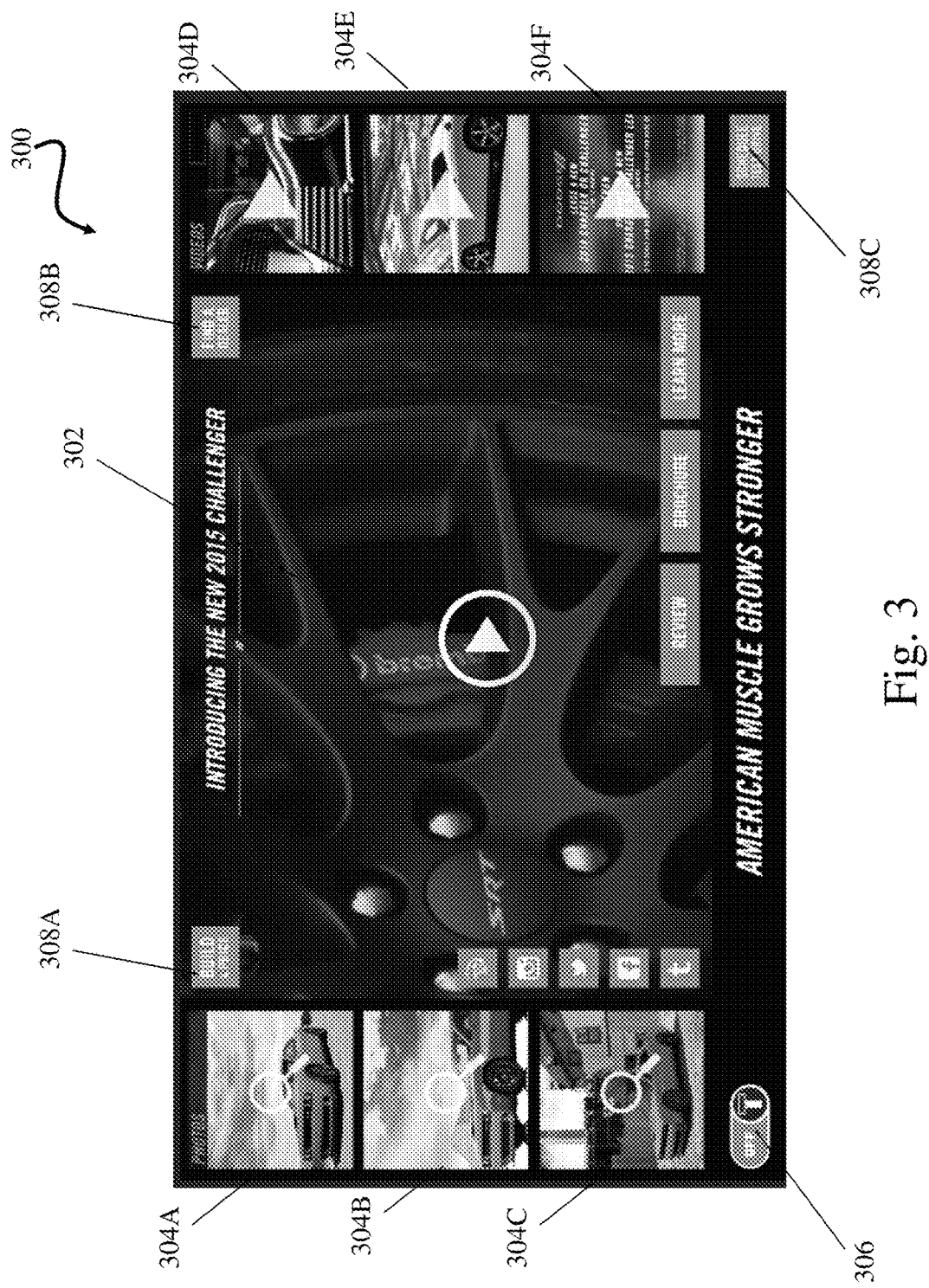
FIG. 3 illustrates an example coordinated presentation that identifies a plurality of interactive portions of a display screen, in accordance with an implementation.

FIG. 3 illustrates an example coordinated presentation 300 provided in accordance with an example implementation of the present application. The coordinated presentation 300 can be provided on data processor processing apparatus(es) 102 and/or user computing device(s) 102. A first portion 302 is provided and that includes content received from a first user computing device 104. Also included in coordinated presentation 300 are a plurality of display units 304A-304F that are independently controllable and that include interactive media content. The media content in the display units 304A-304F can include proprietary playing devices or tools that are configured to enable interaction with the interactive media content at each of a plurality of remote devices. For example, display units 304A-304F can include interactive options, which may include images, video content, website content, or computer programs (collectively referred to herein, generally, as "vApps").

As a user interacts with a coordinated presentation, such as the example coordinated presentation 300 shown in FIG. 3, content provided in the hypertext markup language ("HTML") or other suitable format can be served from the host server in response. This enables a fully (or at least partially) interactive platform. In each of the respective display units 304A-304F, interactive media content can be provided in the form of videos, and each of the respective videos can play simultaneously and independently within each of the respective display units 304A-304F, including as content provided in portion 302 simultaneously plays in an uninterrupted fashion. Alternatively (or in addition), interactive media content provided in respective display units 304A-304F can be provided in a sequential manner, including to pause content provided in portion 302 as respective content provided in a respective display unit 304A-304F plays. Upon completion of the content played in a display unit 304A-304F, content provided, for example, in portion 302 can resume from the point where the content was paused.

In addition to portions of the example coordinated presentation 300 providing content, one or more graphical screen controls can be provided, such as on-off button 306 which, when selected, operates to cause the respective interactive videos to switch operations between interactive and otherwise static content. Also shown in FIG. 3 are a plurality of icons 308 (308A, 308B and 308C) that are formatted to include hyperlinks to additional content. The example coordinated presentation 300 provides content associated with a new automobile (the 2015 Challenger). Icon 308A, when selected, causes instructions to be executed on a respective device (e.g., 102 and/or 104) that results in content to be provided that provides pricing information associated with the new vehicle. Icon 308B, when selected, causes instructions to be executed on a respective device and results in the presentation of a map that identifies locations of respective dealers where the automobile can be located, such as for purchase. Moreover, icon 308C, when selected, causes instructions to be executed on a respective device and results in a scheduling operation to enable an end user to schedule a test drive of the automobile.

Thus, as can be appreciated by the respective interactive controls and display portions of the example coordinated presentation 300 illustrated in FIG. 3, the present application can include functionality in commercial implementations, such as to experience products in a new and interactive way.

Figure 4:
FIG. 4 illustrates an example coordinated presentation in which the content provided in respective display units plays.

FIG. 4 illustrates the example coordinated presentation 300 in which the respective content provided in portion 302 and display units 304A-F actively plays. As can be seen from a comparison with the respective states of operation of the coordinated presentation 300 shown in FIG. 3 and FIG. 4, each respective interactive video content is showing a different frame within the video. In one or more implementations, each of the respective display units 304A-304F (e.g., providing vApps) is selectable vis-à-vis a section tool (e.g., a touchscreen, mouse or other suitable tool). A corresponding selection of the display unit(s) 304A-304F, such as a click of user's mouse, can result in instructions being executed on the corresponding device (e.g., 102 and/or 104), which causes the interactive content in the respective display unit 304A-304F to "launch" and, thereafter, be provided to the respective user computing device in which the selection event occurred.

Figure 5:
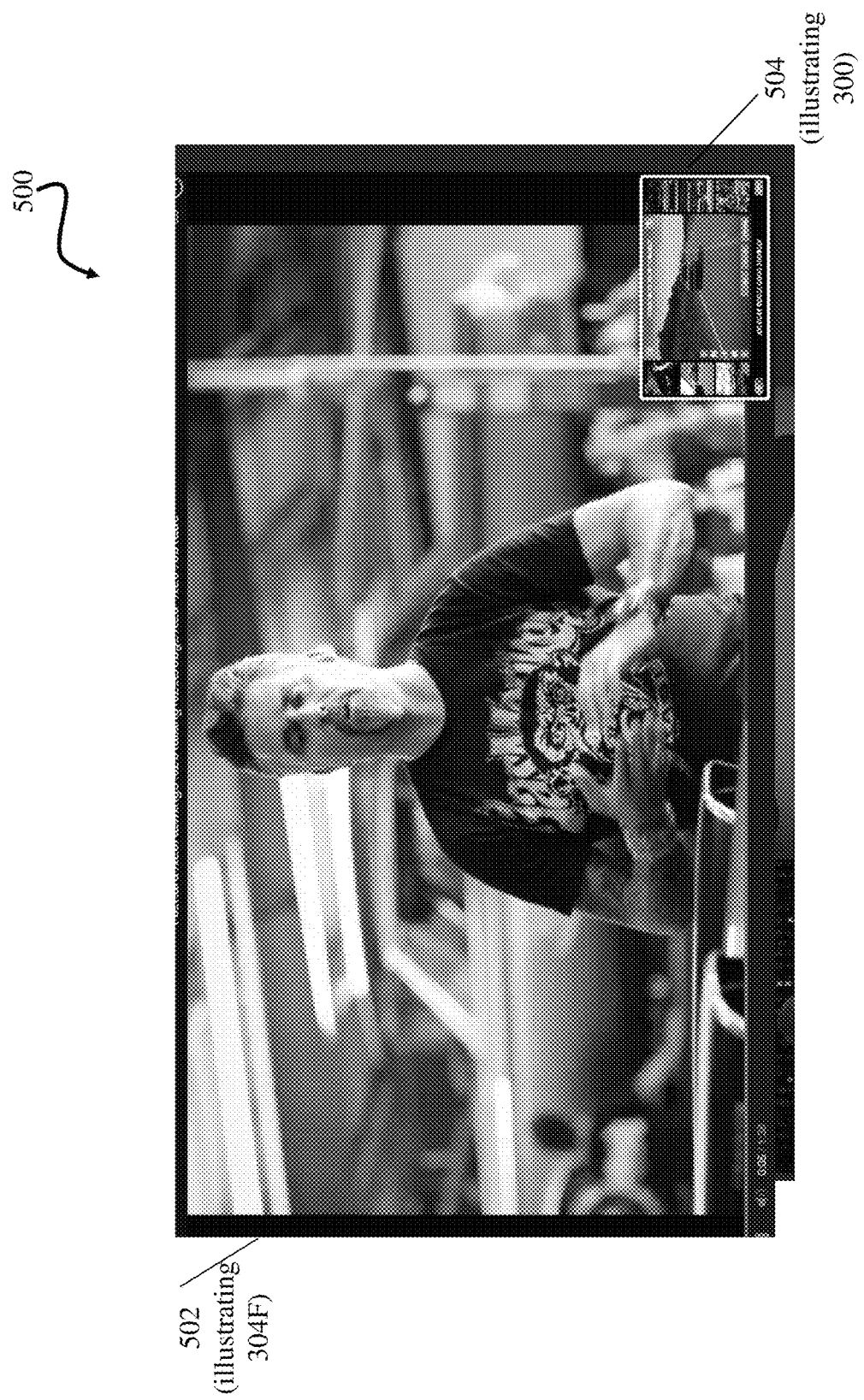
FIGS. 5 and 6 illustrate functionality represented in an example display screen in which one of the respective display units was selected by a user computing device.

FIG. 5 illustrates an example display screen 500 provided in the example coordinated presentation 300, in which one of the respective display units (in this case, display unit 304F) has been selected, for example, by a user computing device 104. In the example implementation illustrated in FIG. 5, the interactive video content provided in corresponding display unit 304F is provided in a relatively full screen format 502, e.g., being rendered in an I-Frame. Thus, when a user selects a respective portion of coordinated presentation 300, such as one of the display units 304A-304F, the display provided in the coordinated presentation 300 can morph, for example, as content is provided in an I-frame 502. This interface eliminates a need to launch content, such as in a new tab in a web browser software application operating on a user computing device 104. By providing content in an uninterrupted fashion in this way, the user's experience with content is not disrupted and the user can enjoy a smooth, fluid transition of content, including from the time of a selection (e.g., of a new display unit 304A-304F).

Continuing with reference to the example display screen 500 illustrated in FIG. 5, a representation of the coordinated presentation 300 as formatted, for example, in FIG. 3, is provided in display portion 504. In the implementation shown in FIG. 5, display portion 504 shows a representation of the coordinated presentation 300 reduced in size and moved to the lower right-hand portion of the screen. The size and location of the representation of coordinated presentation 300 can vary, depending upon the respective implementation and design of the coordinated presentation 300. In one or more implementations of the present application, although content is moved, resized and/or other provided in various displays within coordinated presentation 300, the content continues to play and is provided in an uninterrupted fashion.

Figure 6:
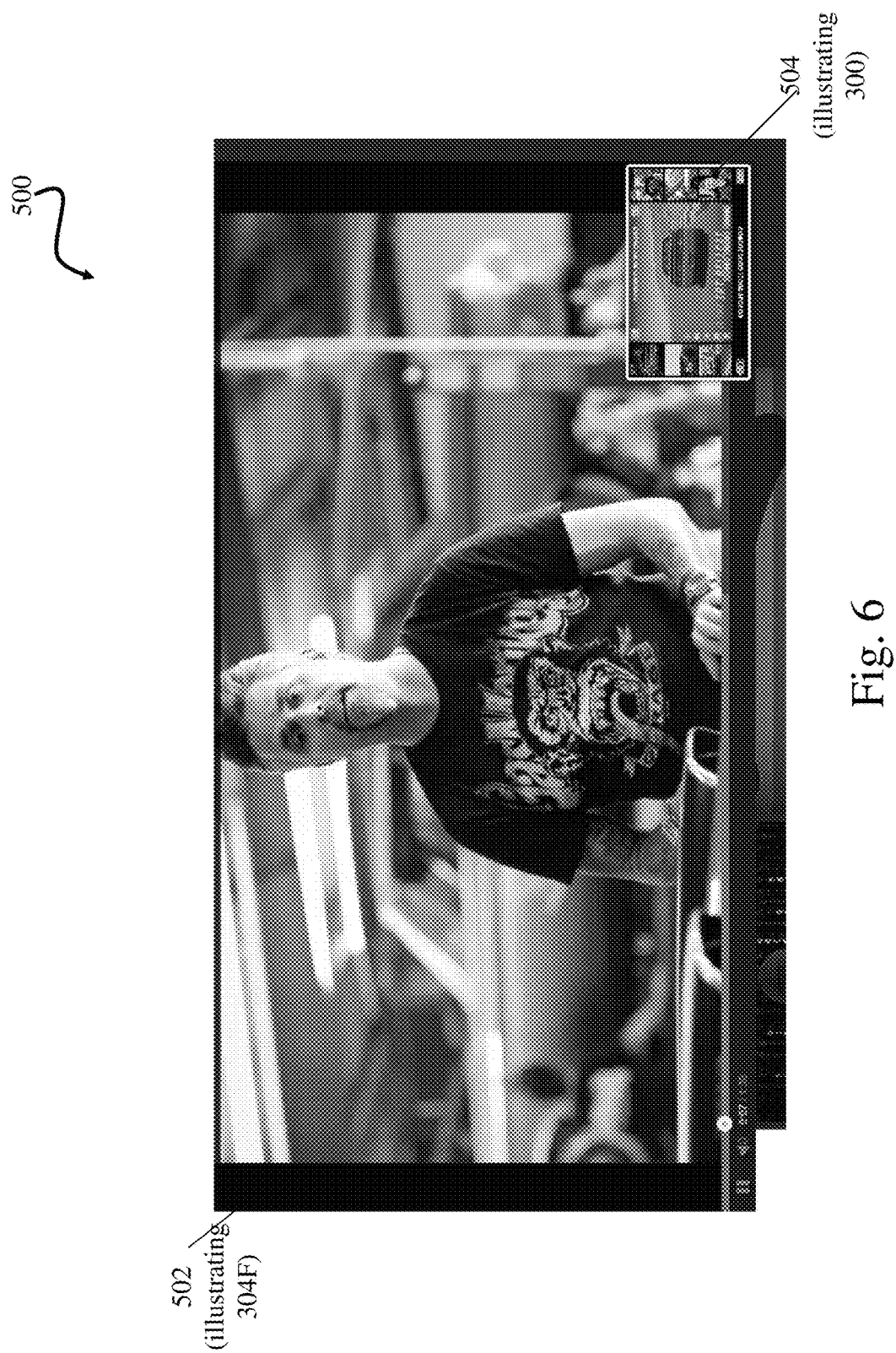

FIGS. 5 and 6 illustrate various states of the coordinated presentation 300 provided in 504 and display unit 304F provided in 502 over a brief period of time. As shown in FIGS. 5 and 6, video content provided in the respective portions (e.g., 502 and 504) continues to play independently. This is demonstrated in the example display screen 500 shown in FIGS. 5 and 6, as the respective frames have changed due to the video simultaneously playing in the respective portions.

One of ordinary skill with appreciate that the selectable portions of coordinated presentation 300 enable content to be formatted and provided in various sizes. In one or more implementations, Upon selection of coordinated presentation 300 in FIG. 5 or 6, for example, coordinated presentation 300 and display unit 304F will modify and be represented substantially as shown in FIGS. 3 and 4. This demonstrates an example implementation of the present application in which a coordinated presentation 300 can be provided dynamically with respective display units 304.

Figure 7:
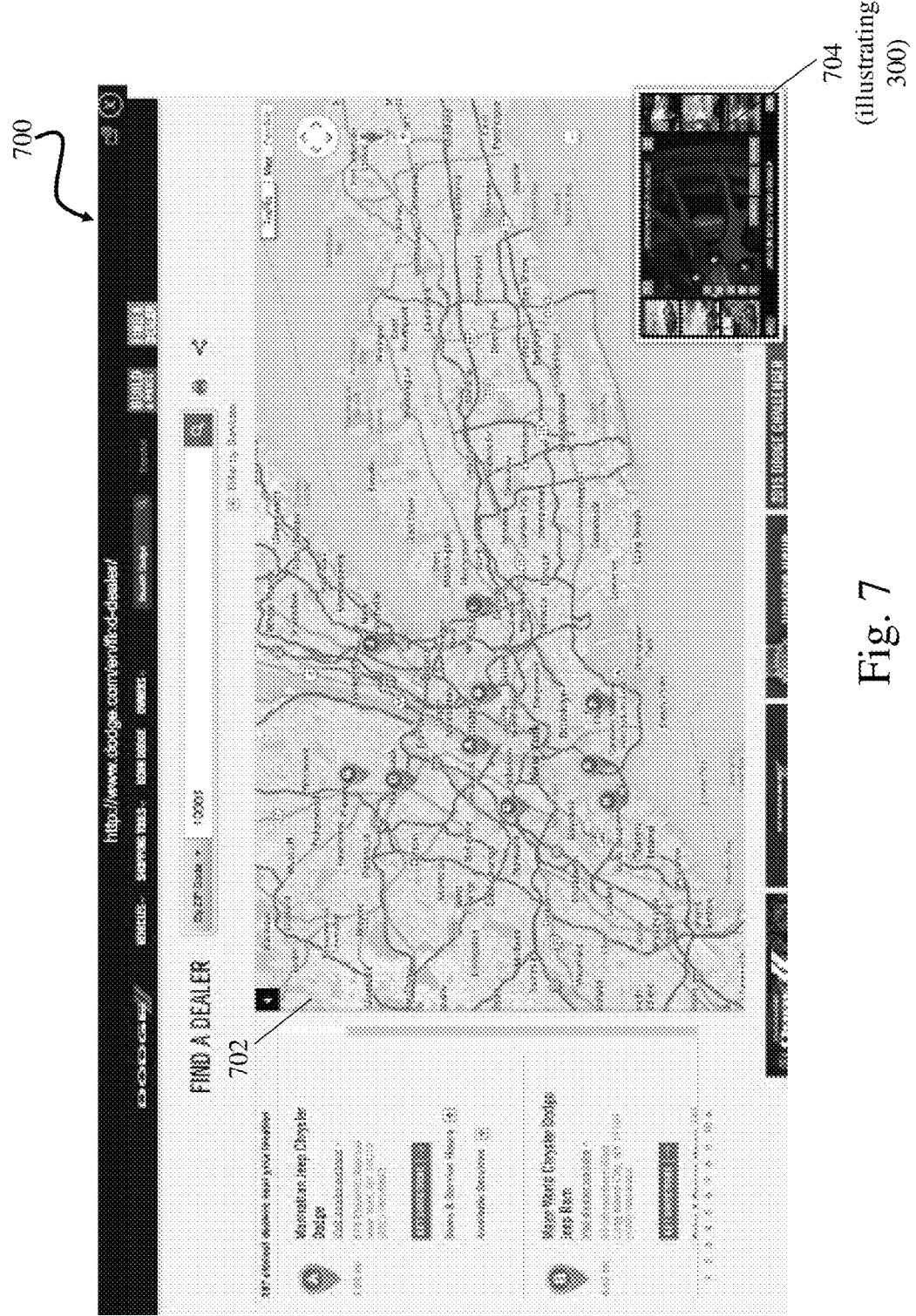
FIG. 7 illustrates another example implementation in which a user has selected an icon and a map is presented.

FIG. 7 illustrates another example implementation in which a user has selected icon 308B to find a dealer, and map 702 is presented in display screen 700. Further, and as shown and described above with regard to FIGS. 5 and 6, the coordinated presentation 300 has been reduced in size and moved to the lower right-hand portion of the screen. Thus and as shown in connection with the example implementation in the display 700, other content in addition to video content in connection with the present application, such as interactive maps, audio, text or other content can be provided as a function of coordinated presentation 300.

Figure 8:
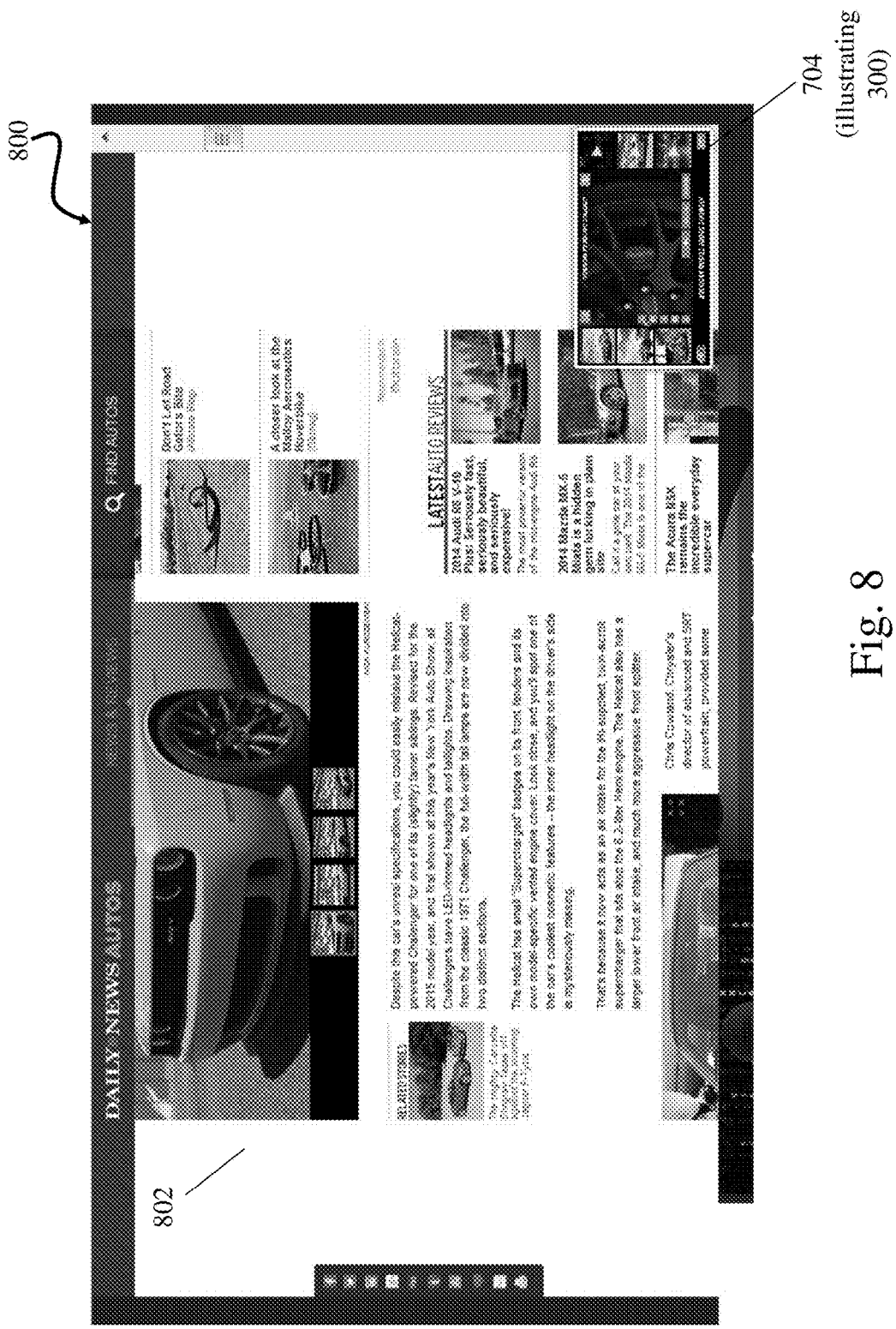
FIG. 8 illustrates another example implementation in which a user has selected an icon to review news information associated with automobiles, which is provided in accordance with an example implementation.

FIG. 8 illustrates another example implementation in which a user has selected icon 308B to review news information associated with automobiles, and newsletter 802 is presented in display screen 800.

Figure 9:
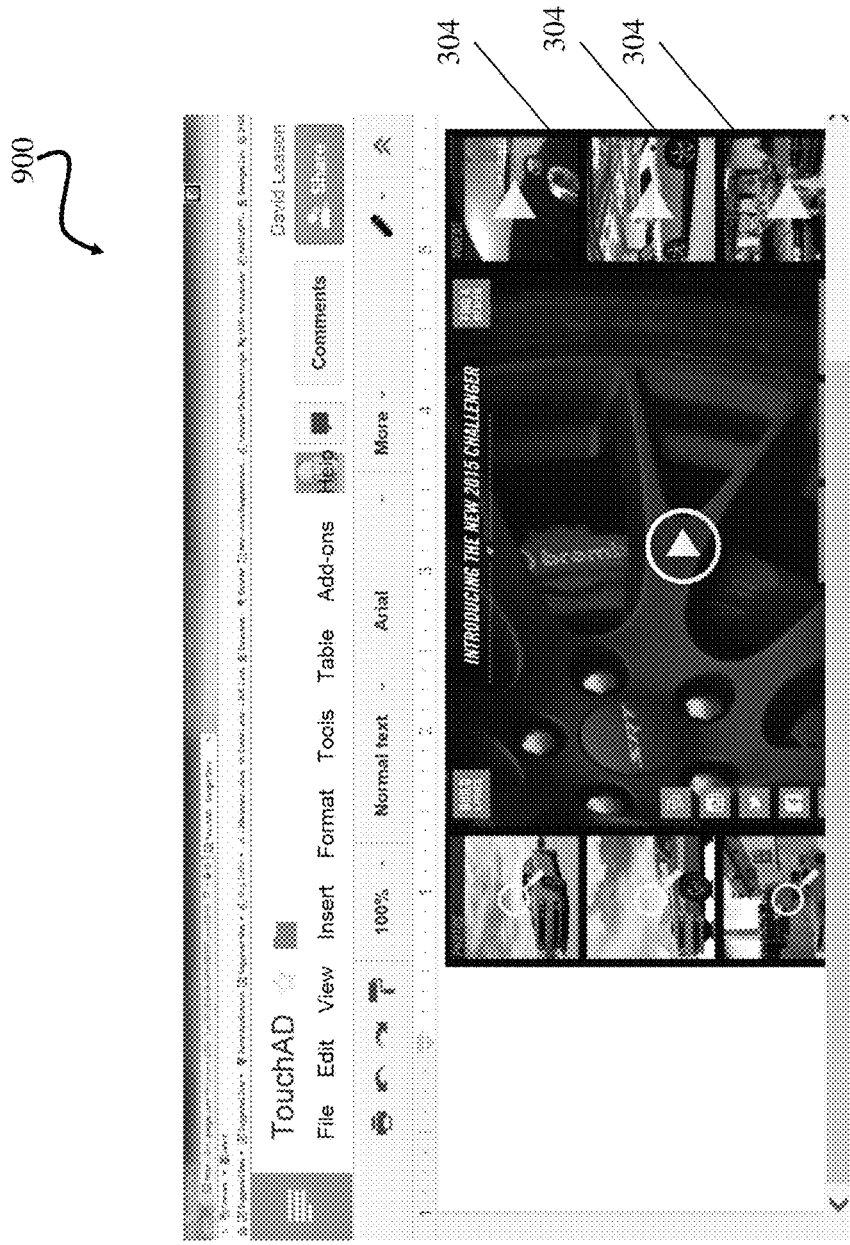
FIG. 9 illustrates a display screen that includes an example user interface that is usable to design and/or generate a coordinated presentation in accordance with an implementation.

Thus, as shown and described herein with reference to FIGS. 3-8, a coordinated presentation 300 can be provided with dynamic display units that provide content, including video content, without interrupting the user's interaction or consumption of content being presented at the time. In one or more implementations, the coordinated presentation 300 can be provided as a form of one or more ad units and a form of an advertising network can be served and/or maintained in accordance with the teachings herein. For example, advertisers can provide ad units that include a player tool and/or interactive content that is integrated in coordinated presentation 300. This provides a new and powerful advertising medium in which users can enjoy content, e.g., video, and be provided with interactive video or other advertising content without interruption of the video or other content they were enjoying. Referred to herein generally as a "TouchAD," FIG. 9 illustrates a display screen 900 that includes an example user interface that is usable to design and/or generate a coordinated presentation 300. Functionality for building a TouchAD in accordance with the present application is further shown and described in co-pending and commonly assigned patent application Ser. No. 14/316, 536. In the example implementation shown in FIG. 9, content from the user's camera or other input device (e.g., microphone) is not integrated into the respective coordinated presentation 300. Instead, video content provided in display portion 302 may serve as the principal content, while display units (e.g., vApps) 304 include curated content for each respective ad unit.

Figure 10:
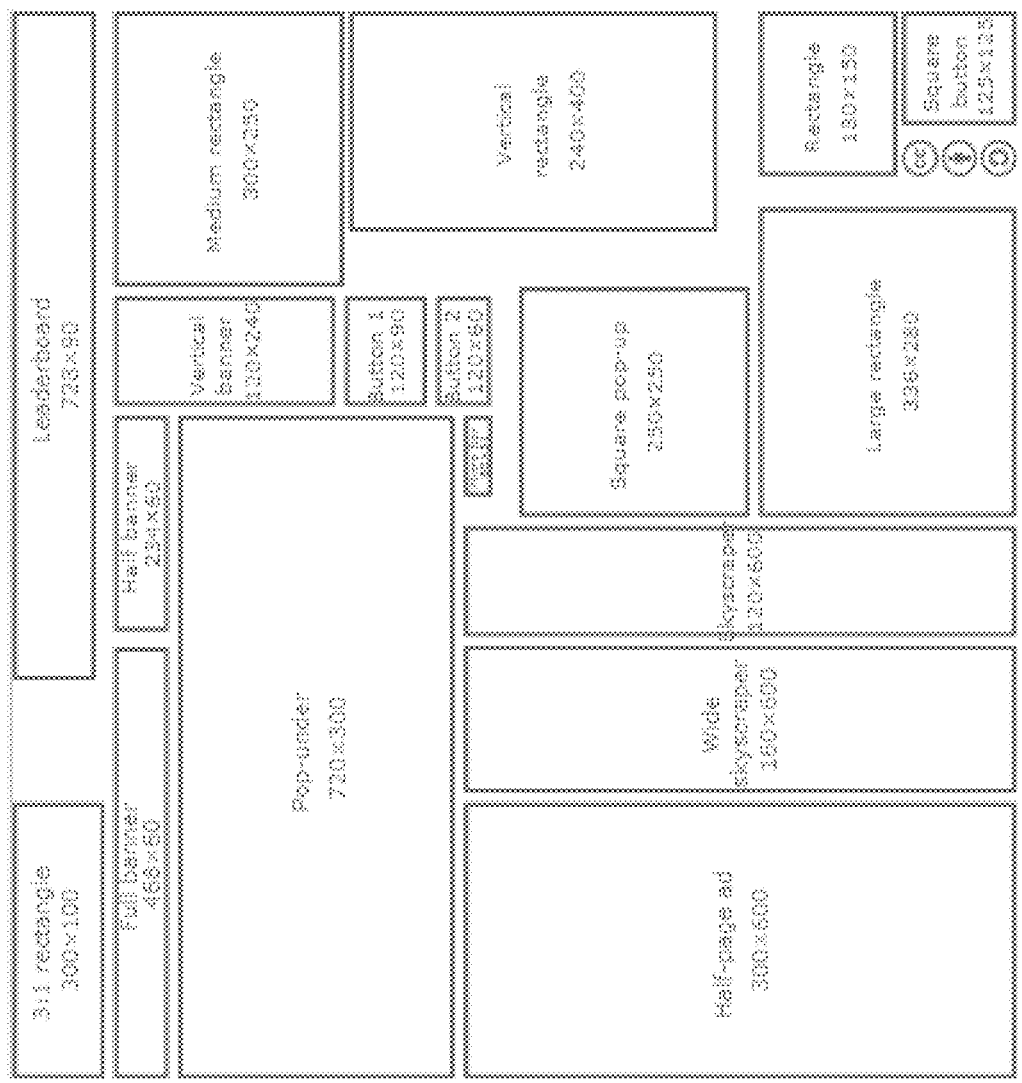
FIG. 10 illustrates example web browser display units and corresponding size dimensions in pixels.

One advantage of the present application regards improving the functionality of a computing device that is effectively free of being bound to a particular plug-in, protocol, display screen "real estate" or other limitations. FIG. 10 illustrates example web browser display units and corresponding size dimensions in pixels. The flexibility of coordinated presentation 300 and display units 304, including for ad units from respective advertisers, can support these and virtually any other dimensions a web site, web page or other application requires. Thus, any of the respective dimension shown in FIG. 10 can be supported by display portion 302 and/or display unit 304.

In one or more implementations, the present application supports capturing information associated with a respective computing device in which coordinated presentation 300 is provided and a selection event occurs. For example, when a user selects display unit 304F, information associated with the selection event is generated and saved in one or more databases. The information may represent relative times and/or locations of the selection activity. For example, 35 seconds into a video playing in display unit 304F, a user clicks his mouse in the top right portion of display unit 304F. The information can be relative to the starting time of the video and/or the relative position of the display unit 304. As selection events information associated with a plurality of computing devices is collected, metrics can be calculated that provide tremendous insights into the effectiveness of a coordinated presentation 300, including with regard to its respective content, layout, functionality, or the like. By knowing when and/or where activity occurs within a coordinated presentation 300 for a plurality of computing devices, trends and other information, such as outliers, can be determined. In one or more implementations of the present application, information stored in one or more databases is accessed by one or more data processing apparatuses 102 and processed to alter or otherwise update a coordinated presentation 300 substantially automatically. Thereafter, the coordinated presentation 300 that is altered by the data processing apparatus 102 is distributed among a plurality of computing devices. As selection events occur in the altered coordinated presentation 300, additional metrics are calculated to determine the effectiveness of the respective altered coordinated presentation 300. Additional alterations to coordinated presentations 300 can occur over time for continued refinement and improvement, as well as new coordinated presentations 300 being developed and/or generated that reference directly or indirectly previously calculated metrics.

Figure 11:
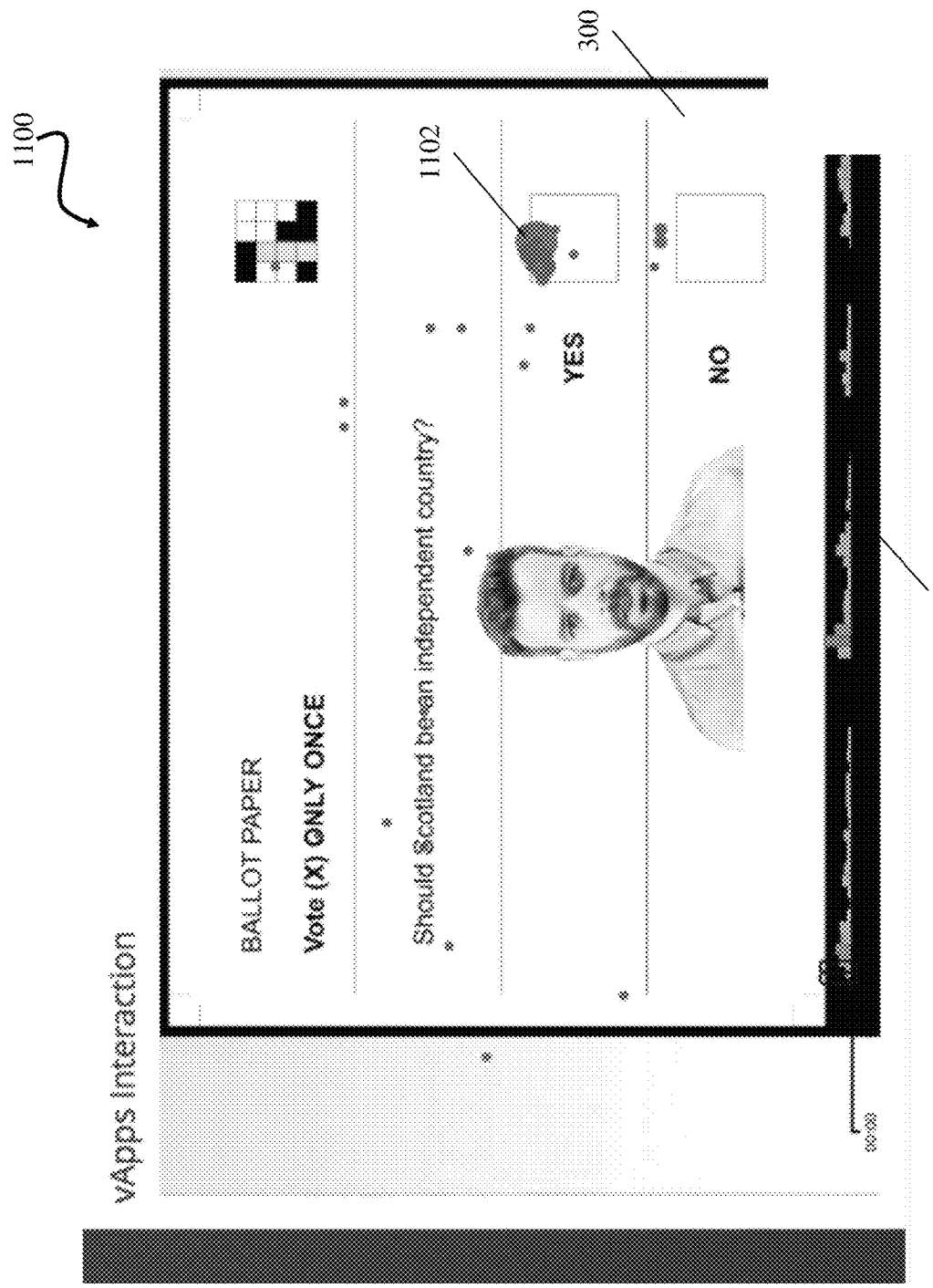
FIGS. 11-13 illustrate example display screens that include a graphical user interface for providing metric information associated with coordinated presentations, in accordance with an implementation of the present application.
Figure 12:
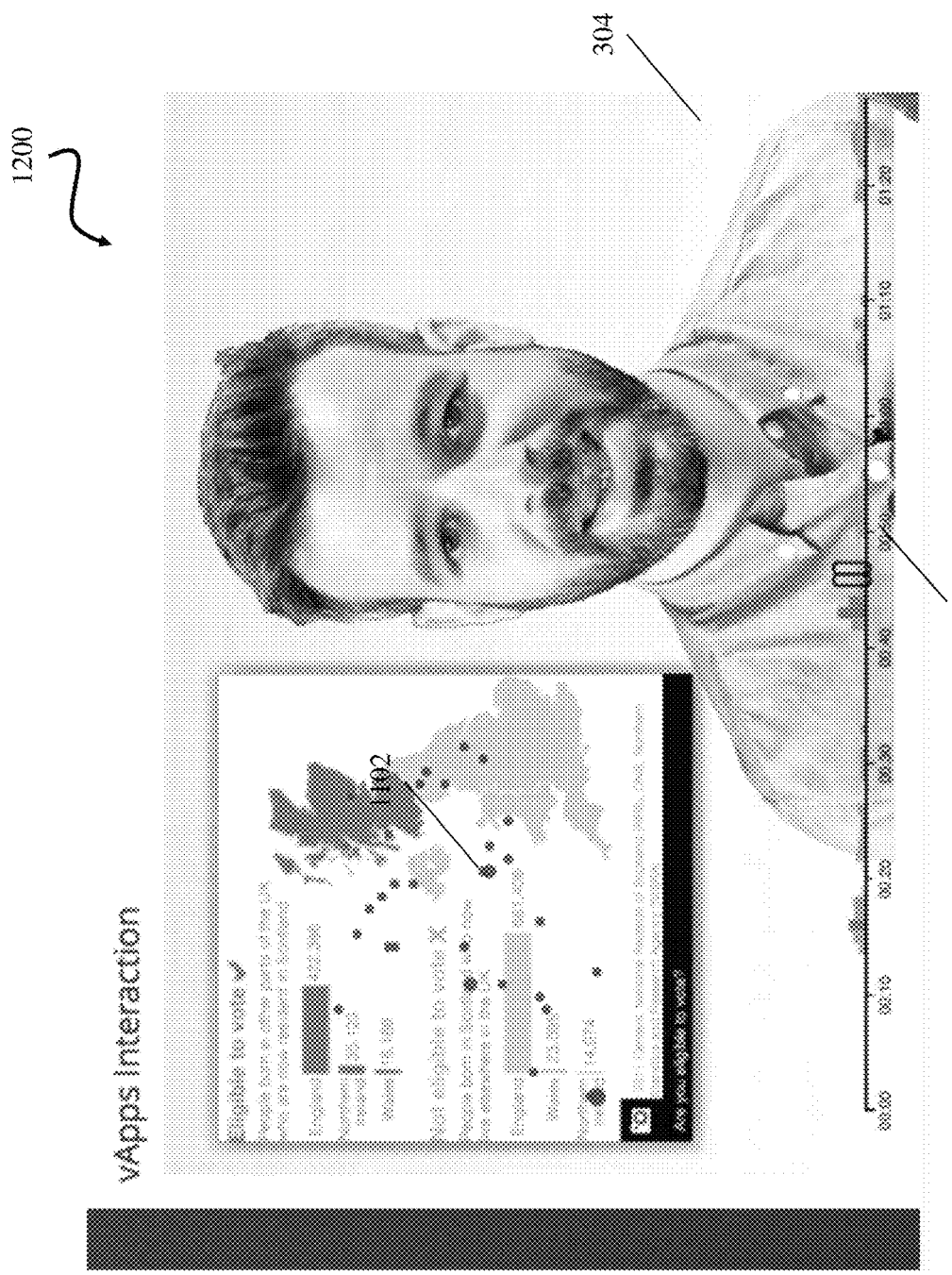
Figure 13:
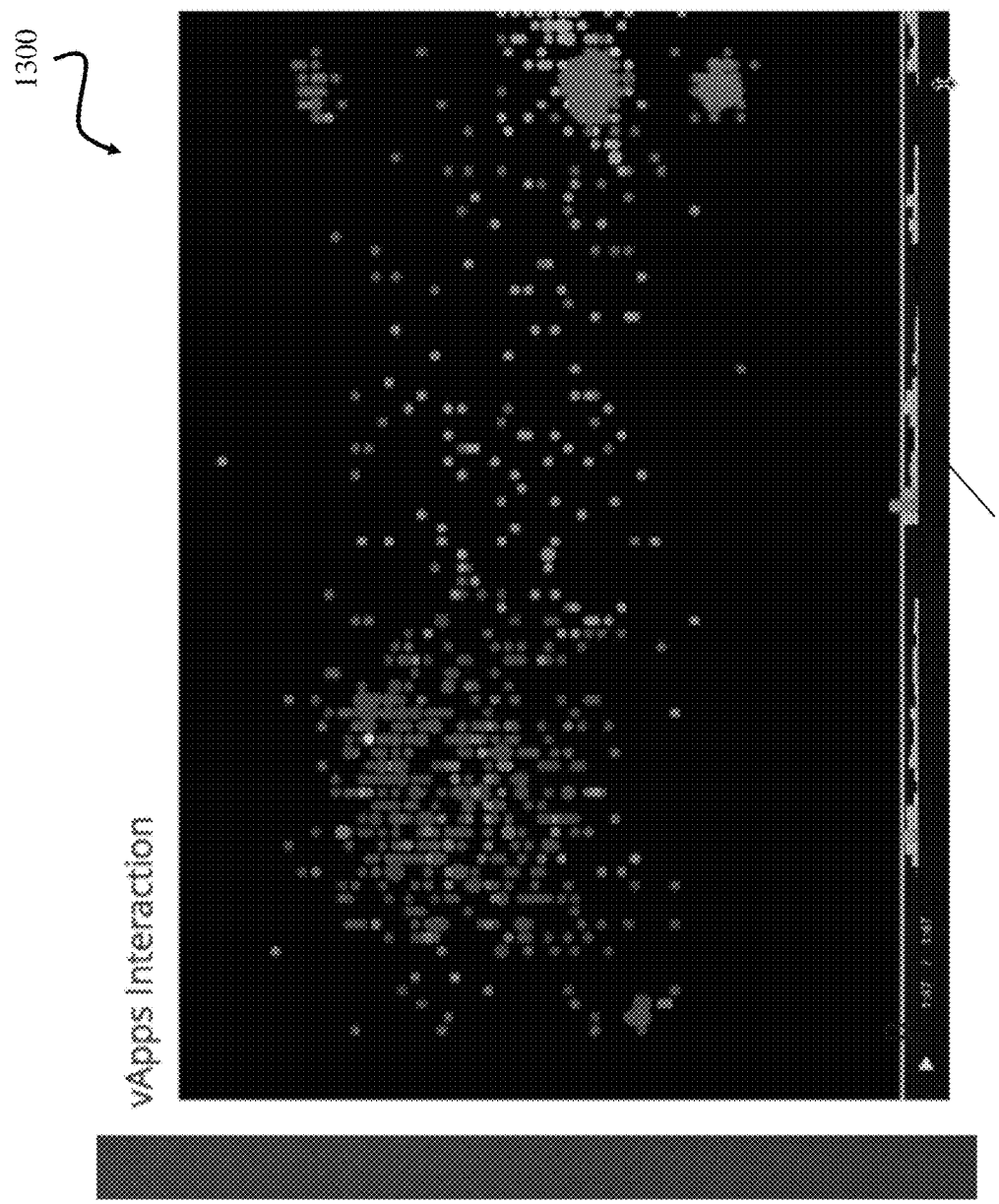

FIGS. 11-13 illustrate example display screens that include a graphical user interface for providing metric information associated with coordinated presentations 300. It will be recognized that such functionality is particularly useful for identifying strengths and weaknesses associated with a coordinated presentation 300 with tremendous specificity.

FIG. 11 illustrates an example display screen 1100 in which a respective coordinated presentation 300 is provided in a video playback format. Moreover, graphical representations in the form of dots 1102 representing user selection events are overlaid thereon and shown substantially in real-time as they occurred as the coordinated presentation 300 was provided on respective user computing devices. In the example shown in display screen 1100, the coordinated presentation 300 regards voting and a poll, with a checkbox for "Yes" and a checkbox for "No" being provided. As shown, a concentration of dots 1102 is provided in or near the "Yes" option, with a few dots near the "No" option. In addition, a few dots are shown around the display that represent stray user clicks, that are not responsive to the poll. Also as shown in display screen 1100 is timeline graphic 1104 that provides a running graphical representation over time as a coordinated presentation 300 is provided in a user computing device, and a concentration of activity that occurs at particular times therein. As can be seen in the timeline graphic 1104, user activity occurs in particular times, which corresponds to the prompts for votes that are presented during the coordinated presentation 300. In other words, as the narrator in the coordinated presentation 300 asks a question and the question is provided in textual form in the presentation, users respond, for example by clicking on the display, which is thereafter represented in the display 1104.

FIG. 12 illustrates another example implementation in display screen 1200 and identifies with greater particularity timeline graphic 1104, as broken into 10 second intervals. This provides significant specificity for users to identify when activity occurs in their respective coordinated presentations 300. Virtually any interval of time can be provided in timeline graphic 1104, such as by selecting a graphical screen control (e.g., a "+" or "−" sign), or respective keystroke (e.g., "Ctrl+" or "Ctrl−"). Also illustrated in FIG. 12 is an image of a map which identifies user engagement and activity by demographic, in this case geographic location, which identifies voter eligibility.

FIG. 13 illustrates an example display screen 1300 which appears as a "heat map" without being overlaid on a respective coordinated presentation 300. This enables another graphical representation of user activity, which is also tied to timeline graphic 1104.

Figure 14:
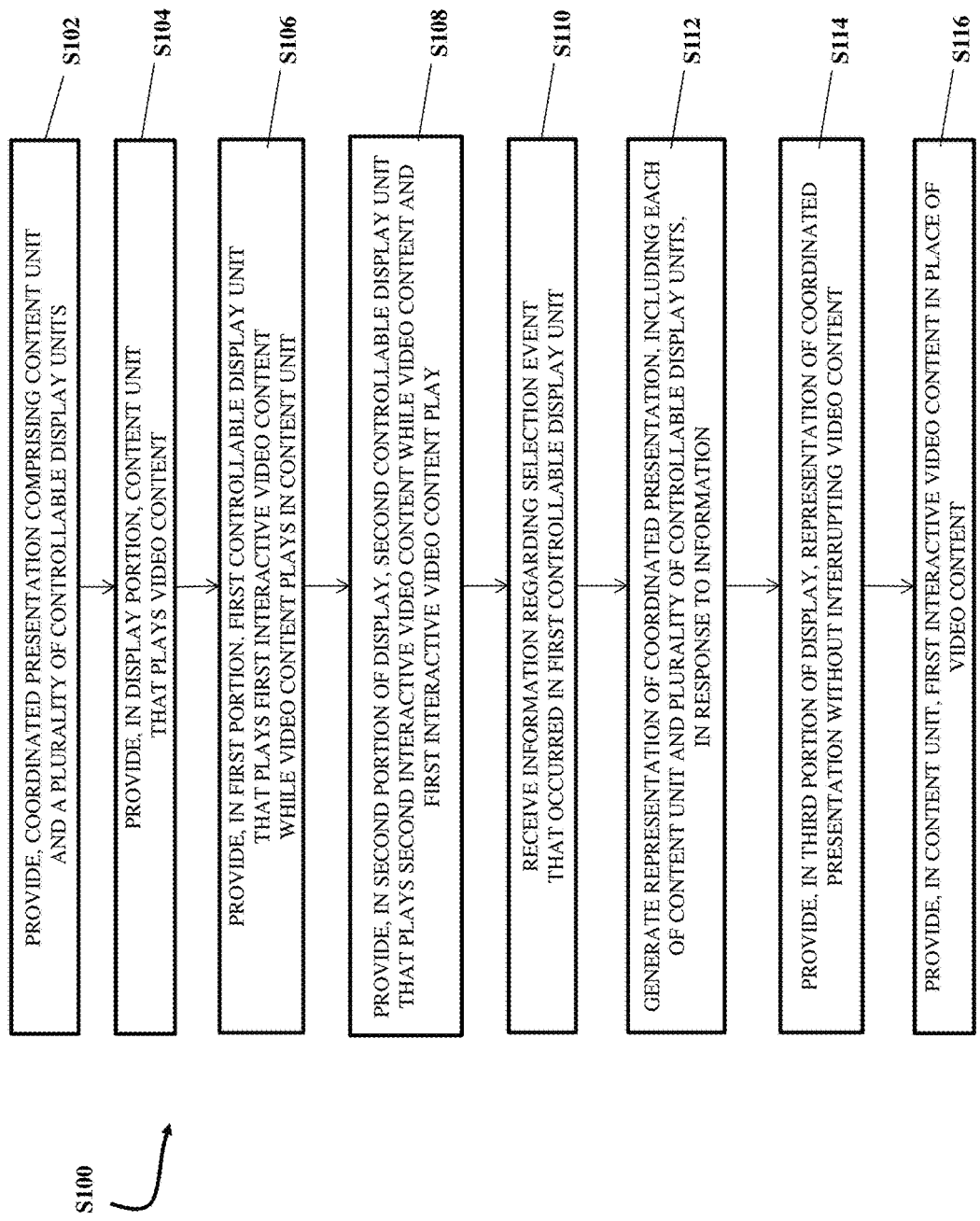
FIG. 14 is a flowchart illustrating example steps associated with an implementation of the present application.

FIG. 14 is a flowchart illustrating example steps S100 associated with an implementation of the present application. It is to be appreciated that the steps described herein have been indicated for facilitating a description of example processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

With further reference to FIG. 14, a coordinated presentation, comprising a content unit and a plurality of controllable display units, is provided (step S102). In a display portion, the content unit is provided that plays video content (step S104). In the example shown in FIG. 3, the display portion 302 plays video associated with an automobile. Furthermore, in a first portion of the coordinated presentation, a first controllable display unit is provided that plays first interactive video content (step S106). The first interactive video content, such as provided in display unit 304A (FIG. 3), plays while the video content plays in the content unit. Moreover, in a second portion of the coordinated presentation, a second controllable display unit is provided that plays second interactive video content (step S108). The second interactive video content, such as provided in display unit 304B (FIG. 3), plays while the video content plays in the content unit and the first interactive video content plays in the first controllable display unit.

Continuing with reference to FIG. 14, at step S110, information regarding a selection event that occurred in the first controllable display unit is received. In response, a representation of the coordinated presentation, including each of the content unit and the plurality of controllable display units, is generated (step S112). Moreover and in a third portion, the generated representation of the coordinated presentation is provided in a third controllable display unit (step S114). The representation of the generated coordinated presentation is provided without interrupting the playing of the video content. Furthermore, and at step S116, the first interactive video content is provided in the content unit, and in place of the video content that was previously provided at that location. An example is illustrated in display unit 302 (FIG. 4).

In addition to providing interactive content in dynamic and compelling ways, the present application allows for managing information that was previously unmeasurable and, accordingly, unmanageable. Deep insights are provided as a result of usage and interaction by users of coordinated presentations 300, in terms of numbers and corresponding graphical representations. A web-based analytic tool, substantially as shown herein, is provided for presenters and distributors of coordinated presentations 300. As a coordinated presentation is played in the Web-based analytic tool, dots begin to appear over time that represent user interaction at that point in time in the coordinated presentation 300. By viewing the size of formations from the dots 1102, e.g., "blobs" that are formed from a concentration of dots 1102, information can be obtained associated with user activity. This provides insights into users' minds and reflects their respective curiosities, as the users interact with coordinated presentations 300 in real-time. Timeline graphic 1104 can be formatted to include bar graphs that represent high and low points of user activity. As content is introduced, such as by a presenter of a coordinated presentation 300, user activity can be identified with particularity with regard to space and time.

With regard to respective ad units provided in display units 304, advertisers can watch videos and heat maps of their respective coordinated presentations 300 to identify numbers of viewers, an activity that occurs as a result of the options provided therein.

Thus, the present application provides significant flexibility and creativity in connection with creating and viewing coordinated presentations. Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A method for providing uninterrupted video content in a portion of a display while simultaneously providing other content in separate portion of the display, the method comprising:

providing, by a processor configured with code stored or encoded on a non-transitory computer readable medium, a coordinated presentation comprising a content unit and a plurality of controllable display units;

providing, by a processor configured with code stored or encoded on a non-transitory computer readable medium, and in a display portion, the content unit that plays video content;

providing, by a processor configured with code stored or encoded on a non-transitory computer readable medium, in a first portion, a first controllable display unit that plays first interactive video content while the video content plays in the content unit;

providing, by a processor configured with code stored or encoded on a non-transitory computer readable medium, in a second portion of the display, a second controllable display unit that plays second interactive video content while the video content plays in the content unit and the first interactive video content plays in the first controllable display unit;

receiving, by a processor configured with code stored or encoded on a non-transitory computer readable medium, information regarding a selection event that occurred in the first controllable display unit;

generating, by a processor configured with code stored or encoded on a non-transitory computer readable medium, a representation of the coordinated presentation, including each of the content unit and the plurality of controllable display units, in response to the information;

providing, by a processor configured with code stored or encoded on a non-transitory computer readable medium, in a third controllable display unit in a third portion of the display, the representation of the coordinated presentation without interrupting the playing of the video content; and providing, by a processor configured with code stored or encoded on a non-transitory computer readable medium, in the content unit, the first interactive video content, wherein the first interactive video content replaces the video content and without interrupting the playing of the first interactive video.

2. The method of claim 1, wherein at least one of the content unit, first controllable display unit and second controllable display unit includes a player tool.

3. The method of claim 1, further comprising:
receiving, by a processor configured with code stored or encoded on a non-transitory computer readable medium, information regarding a selection event that occurred in the third controllable display unit; and
providing, by a processor configured with code in the content unit, the video content, wherein the video content replaces the first interactive video content without interrupting the playing of the video content.

4. The method of claim 1, wherein at least one of the first and second interactive media includes an advertisement.

5. The method of claim 1, processing, by a processor configured with code stored or encoded on a non-transitory computer readable medium, the information regarding the selection event to determine at least one of a relative time and a relative location of the selection event.

6. The method of claim 5, further comprising:
generating, by a processor configured with code stored or encoded on a non-transitory computer readable medium, metrics associated with the selection event; and
storing, by a processor configured with code stored or encoded on a non-transitory computer readable medium, the metrics in a database.

7. The method of claim 6, further comprising providing, by a processor configured with code stored or encoded on a non-transitory computer readable medium, a user interface that includes at least one graphical representation of the metrics.

8. The method of claim 7, wherein the graphical representation displays a plurality of dots, each dot representing a selection event occurring at the location where a respective dot is displayed.

9. A system for providing uninterrupted video content in a portion of a display while simultaneously providing other content in separate portion of the display, the method comprising:
at least one processor;
a memory that is accessible by the at least one processor;
a display that is accessible by the at least one processor and that is configured to display content, wherein, when executing at least some code stored in the memory, at least one processor is configured to:
provide a coordinated presentation comprising a content unit and a plurality of controllable display units;
provide in a display portion, the content unit that plays video content;
provide in a first portion, a first controllable display unit that plays first interactive video content while the video content plays in the content unit;
provide in a second portion of the display, a second controllable display unit that plays second interactive video content while the video content plays in the content unit and the first interactive video content plays in the first controllable display unit;
receive information regarding a selection event that occurred in the first controllable display unit;
generate a representation of the coordinated presentation, including each of the content unit and the plurality of controllable display units, in response to the information;
generate in a third controllable display unit in a third portion of the display, the representation of the coordinated presentation without interrupting the playing of the video content; and provide in the content unit, the first interactive video content, wherein the first interactive video content replaces the video content and without interrupting the playing of the first interactive video.

10. The system of claim 9, wherein at least one of the content unit, first controllable display unit and second controllable display unit includes a player tool.

11. The system of claim 9, wherein, when executing at least some of the code stored in the memory, at least one processor is further configured to:

receive information regarding a selection event that occurred in the third controllable display unit; and provide in the content unit, the video content, wherein the video content replaces the first interactive video content without interrupting the playing of the video content.

12. The system of claim 9, wherein at least one of the first and second interactive media includes an advertisement.

13. The system of claim 9, wherein, when executing at least some of the code stored in the memory, at least one processor is further configured to:

process the information regarding the selection event to determine at least one of a relative time and a relative location of the selection event.

14. The system of claim 13, wherein, when executing at least some of the code stored in the memory, at least one processor is further configured to:

generate metrics associated with the selection event; and store the metrics in a database.

15. The system of claim 14, wherein, when executing at least some of the code stored in the memory, at least one processor is further configured to:

provide a user interface that includes at least one graphical representation of the metrics.

16. The system of claim 15, wherein the graphical representation displays a plurality of dots, each dot representing a selection event occurring at the location where a respective dot is displayed.

17. A system for providing uninterrupted video content in a portion of a display while simultaneously providing other content in separate portion of the display, the system comprising:

one or more non-transitory processor readable media;

one or more processors operatively coupled to the one or more non-transitory processor readable media;

the one or more processor readable media having instructions for causing the following steps to be performed by the one or more processors:

providing in a first portion of the display an independently controllable content unit that includes first content received from a first remote computing device;

providing in a second separate portion of the display an independently controllable display unit that includes interactive media content, wherein the display unit is configured to enable interaction at each of a plurality of remote devices, such that results of a respective interaction at a particular remote device is viewable at the particular remote device but are not viewable at other of the remote devices;

processing information representing a selection event occurring in the display unit, to determine at least one of a relative time and a relative location of the selection event in the second portion of the display;

storing, in at least one database; the information representing the selection event; and processing the selection event to enable the interaction with at least a portion of the interactive media content at one of the remote devices such that results of a respective interaction associated with the selection event is viewable at one particular remote device but not viewable at other of the remote devices.

* * * * *